Dec. 12, 1950         T. W. G. LYONS         2,533,272
ANTIVIBRATION ATTACHMENT FOR "DOALL" MACHINES
Filed June 1, 1949         3 Sheets—Sheet 1
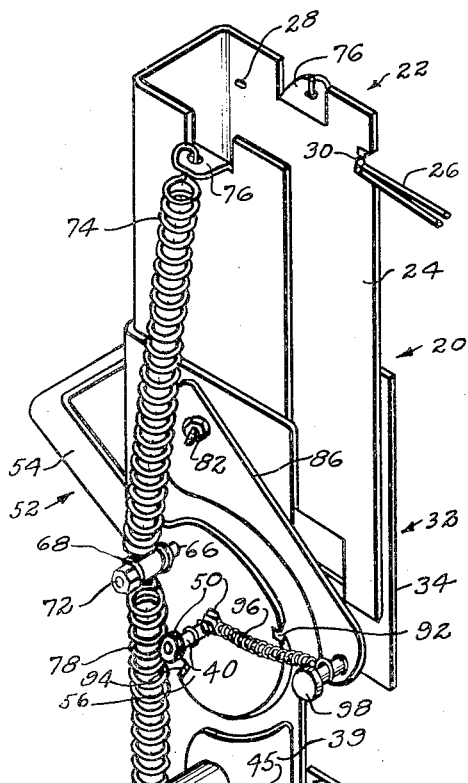
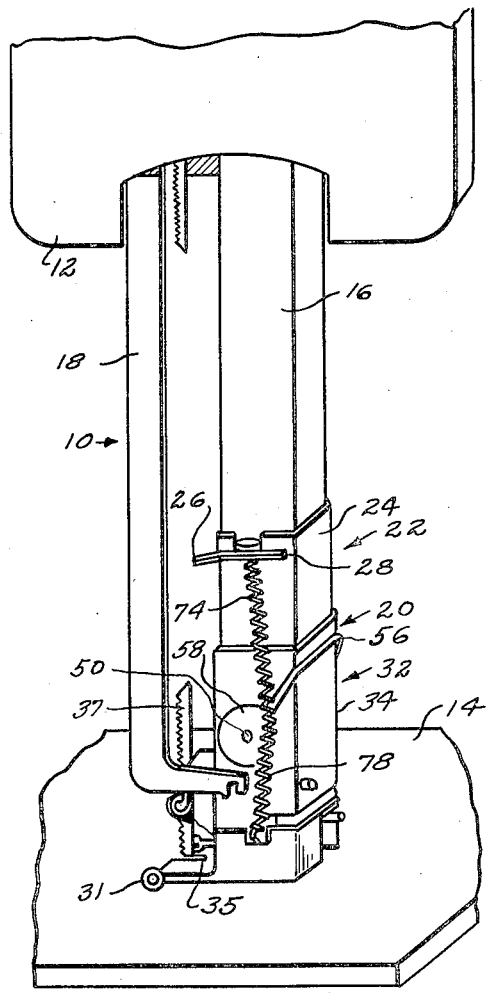
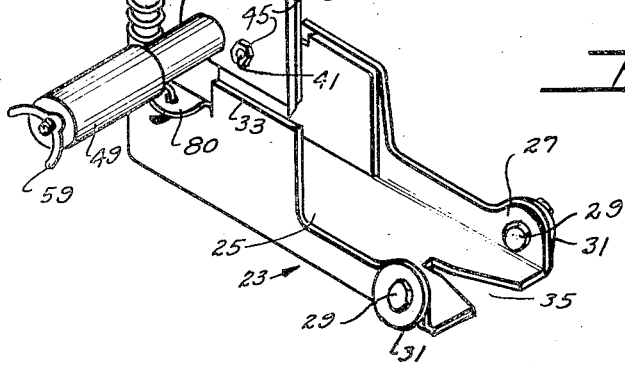
INVENTOR.
THOMAS W. G. LYONS
BY Wade Koonty AND
Frederick W. Cotterman
ATTORNEYS Dec. 12, 1950 T. W. G. LYONS 2,533,272
ANTIVIBRATION ATTACHMENT FOR "DOALL" MACHINES
Filed June 1, 1949 3 Sheets—Sheet 2

INVENTOR.
THOMAS W. G. LYONS
BY Wade Koontz AND
Frederick W. Cotterman
ATTORNEYS Dec. 12, 1950        T. W. G. LYONS        2,533,272
ANTIVIBRATION ATTACHMENT FOR "DOALL" MACHINES
Filed June 1, 1949        3 Sheets-Sheet 3
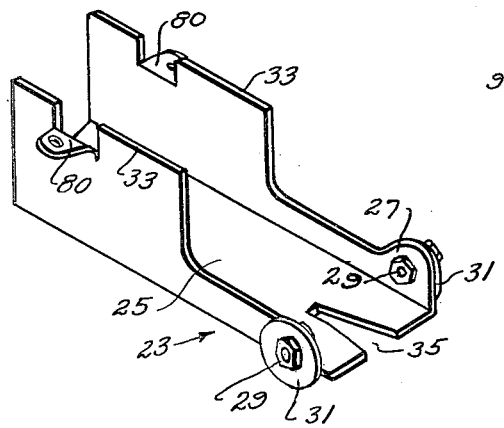
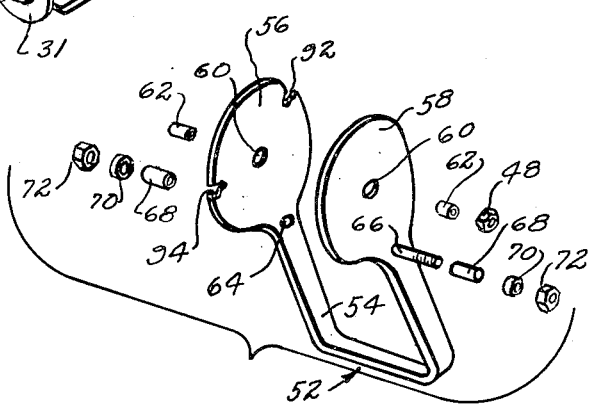
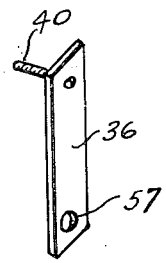
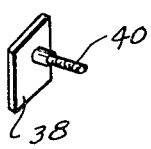
INVENTOR.
THOMAS W. G. LYONS
BY Wade Komity AND
Frederick W. Cotterman
ATTORNEYS Patented Dec. 12, 1950

2,533,272

UNITED STATES PATENT OFFICE 2,533,272

ANTIVIBRATION ATTACHMENT FOR "DOALL" MACHINES

Thomas W. G. Lyons, Banning, Calif.

Application June 1, 1949, Serial No. 96,607

7 Claims. (Cl. 143—157)

(Granted under the act of March 3, 1883, as amended April 30, 1928; 370 O. G. 757)

The invention described herein may be manufactured and used by or for the United States Government for governmental purposes without payment to me of any royalty thereon.

This invention relates to an attachment for use on a band saw or jig saw when sawing large sheets of metal, plastic, wood, fibre board or the like.

Saws of the above character are furnished with an adjustable hold-down stop adjacent the saw which may be raised or lowered to suit the thickness of the sheet, some play being allowed, however, for variation in the thickness of the material.

Where large sheets extend considerably beyond the edge of the saw table it becomes advisable to provide roller supports on the underside of the sheet intermediate the saw and the edge of the sheet, for otherwise the sag of the sheet at the outer edge will raise the center of the sheet at the saw upward against the hold down stop and off the table which will result in excessive chatter of the sheet.

Even where rollers are provided, the slight play which must be allowed between the work and the hold down stop admits of a considerable vibration being set up in the sheet while it is being sawed.

It is therefore an object of this invention to provide an attachment which includes a spring loaded hold-down stop or pressure foot which will hold the sheet down firmly and without play but which will yield when necessary to permit slight variation in the thickness of the sheet to the end that chatter and other vibration will be largely eliminated.

Another object of the invention is to provide means whereby the extent of the hold-down pressure of the pressure foot may be varied to suit sheets of different size and thickness and of a different kind of material.

Another object is to provide a manually operable means whereby the pressure foot may be raised completely off the work, when a sheet of material is to be brought up to the saw to start a cut or removed from the saw after the cut is completed, without altering the degree of pressure for which the pressure foot is set.

Another object is to provide a spring controlled hold-down or pressure foot which may be attached quickly and easily to a band or jig saw and which may be removed with equal facility without requiring any alteration whatever in the design of the saw post.

Other objects, advantages and meritorious features, which result from certain features of construction and operation, will be apparent upon consideration of the more detailed description considered in conjunction with the drawings, wherein:

Fig. 1 is a side view of the attachment in perspective showing a portion of a band saw frame, table and band saw post with my anti-vibration device attached.

Fig. 2 is a perspective view, drawn to a larger scale than Fig. 1, of the other side of the device when removed from the band saw post.

Fig. 6 is a perspective view of a pressure-foot which is firmly welded to the lower end of the inner frame assembly Fig. 5.

Fig. 7 is an exploded perspective view of the operating lever assembly which is hinged on the outer frame Fig. 4 for raising or lowering the inner frame assembly Fig. 5.

Fig. 8 is a perspective view of a locking lever for retaining the operating lever Fig. 7 in the raised or in the lowered position.

Figs. 9 and 10 are perspective views of guide lugs for controlling the respective vertical sliding movement between the frame parts Fig. 4 and Fig. 5.

Like reference characters refer to like parts throughout the several views.

Figure 3:
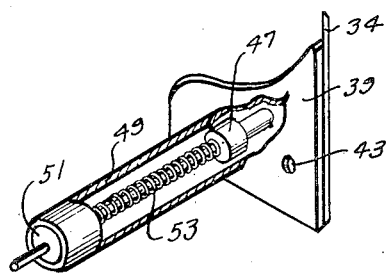
Fig. 3 is an assembly view in perspective of a locating plunger which secures one part of the attachment against vertical movement on the band saw post.

Referring particularly to the side view, Fig. 1, a band saw 10 with standard frame 12, table 14, post 16 and hold-down 18 is equipped with the anti-vibration attachment 20 which I have selected to illustrate my invention.

Figure 5:
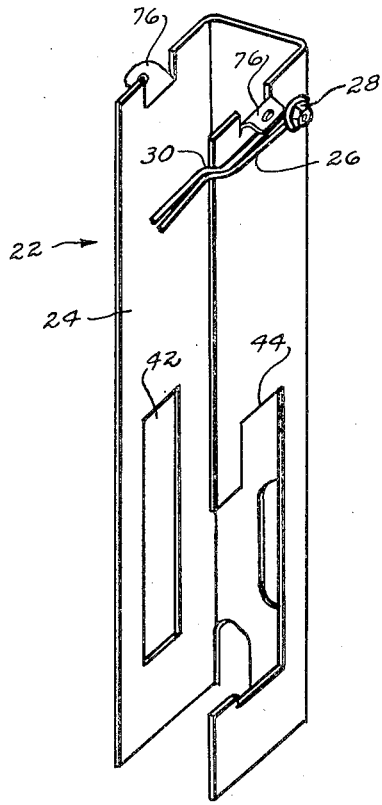
Fig. 5 shows, in perspective, the inner frame assembly which is arranged for vertical sliding movement on the band saw post.

The anti-vibration attachment, shown in position on the band saw in Fig. 1 and shown detached from the band saw and to a larger scale in Fig. 2 comprises an inner frame assembly 22 (see Fig. 5) which includes an inner frame 24 having the front side open, thereby providing a channel shape which fits slidably around the back and two sides of the saw post 16, Fig. 1. A spring wire catch 26 of hairpin formation, best seen in Fig. 5, has the closed end secured by a bolt 28 to the inner frame 24 and intermediate the ends is offset as at 30 whereby, when the inner frame 24 is brought from the back forward over the saw post 16, the offset part 30 will snap around the front of the saw post and hold the upper end of the inner frame 24 in place yet allow vertical sliding movement of the inner frame 24 on the saw post 16.

A pressure foot assembly 23, shown separately in Fig. 6, comprises a trough like frame member 25 having opposite ears 27 carrying bolts 29 which rotatably support antifriction rollers 31. The sides of the trough are extended upwardly at 33 and the lower end of the inner frame 24 fits between these upwardly extending ends and is permanently secured thereto by welding or like process, whereby the pressure foot may be raised and lowered by vertical actuation of the inner frame assembly 22 with respect to the saw post 16. A notch 35 is provided for clearing the saw blade 37.

An outer frame assembly 32 includes a channel shaped frame 34 which fits slidably over the inner frame 24. Rectangular guide lugs 36 and 38, see Figs. 9 and 10, having threaded studs 40 projecting laterally from the flat sides thereof are slidably fitted to rectangular openings 42 and 44 respectively in the inner frame 24. When the outer frame 34 is assembled over the inner frame 24, the lugs 36 and 38 may be placed in the rectangular openings 42 and 44 from the inside by entering the threaded studs 40 into drilled openings 46 in the outer frame 34 then placing nuts 50 over the extended threaded portion of the studs. The lugs 36 and 38 are slightly thicker than the sides of the inner frame 24 thus maintaining the sliding clearances between the inner and outer frames.

A base plate 39 (see Figs. 2 and 3) is supported on the outer frame 34 by a stud 41. The stud 41 has its inner end fastened in the outer frame 34 by welding or similar process. The plate 39 has an opening 43 through which the stud 41 extends. A nut 45 fastens the base plate 39 to the outer frame 34.

Figure 4:
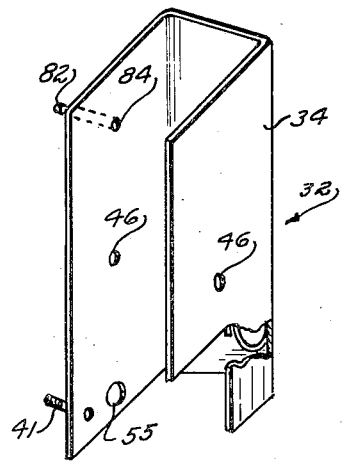
Fig. 4 shows, in perspective, the outer frame assembly, which is fixed to the band saw post to prevent vertical movement of the frame assembly with respect to the post.

Base plate 39 is provided for supporting the spring actuated plunger 47 which is slidable in a tubular casing 49 fast in the plate 39, the casing being closed at the outer end by a bushing 51 which provides bearing for the outer end of the plunger. A spring 53 reacts against the bushing 51 to urge the plunger inward through an opening 55 in the outer frame 34 (see Fig. 4) through opening 57 in the guide lug 36 then into an opening which is in the band saw post when received from the manufacturer. A wing nut 59 limits the inward movement of the plunger, adjusts the spring tension, and provides a means for withdrawing the plunger. When the plunger is inserted as described, the outer frame 34 is fixed against vertical movement with respect to the band saw post 16.

The operating lever assembly 52, shown in the exploded perspective view Fig. 7, comprises a U-shaped handle 54 with discs 56 and 58 formed integral on the open ends of the U. Openings 60 extend through the centers of discs 56 and 58 and bushings 62 are inserted in the openings 60. Bushings 62 in turn have openings of a size to receive the studs 40, see Figs. 9 and 10. By assembling the outer frame 34 over the inner frame 24, and the operating lever 54 over the outer frame 34, the studs 40 may be inserted through the bushings 62 from the inside while the lugs 36 and 38 are being inserted into the rectangular openings 42 and 44. Nuts 48 are provided for the threaded ends of the studs 40 where they extend through bushings 62 to the outside of the discs 56 and 58. The bushings 62 are slightly longer than the thickness of the discs 56 and 58 whereby operating clearances of the discs with the outer frame is maintained.

Substantially at the points where the operating handle 54 widens to form the discs 56 and 58 are two openings 64 each of which supports a threaded stud 66. Studs 66 may preferably be permanently fixed in the openings 64 by welding or like means. A sleeve 68, washer 70 and nut 72 are assembled in that order on each stud 66.

On each side of the framework, a relatively strong extension coil spring 74 has its lower end hooked around a sleeve 68 and its upper end hooked into an ear 76 extending laterally from the inner frame 24, and also on each side a somewhat weaker extension coil spring 78 has its upper end hooked around the same sleeve 68 and its lower end hooked into an ear 80 extending laterally from the pressure foot 25.

A stud 82 fastened at the inner end in the outer frame 34 at 84 (see Fig. 4) provides pivotal support for a locking lever 86 (see Fig. 8). Locking lever 86 has an opening 88 which fits a bushing 83 which in turn fits over the stud 82, and at the other end has a pawl 90 which drops into notches 92 or 94 in the disc 56, whereby the pressure foot is resiliently held in the raised or in the lowered position. A light coil spring 96 has one end hooked over a stud 98 which is fast in the locking lever adjacent the pawl, and the other end hooked around a stud 40 which extends outwardly from the lug 36 through the disc 56. Nuts 50 keep the spring 96 in place. The spring 96 is thus tensioned to keep the pawl 90 in the notch 92 or the notch 94.

The illustrative embodiment of subject invention may be installed on a band saw as follows:

With the operating lever 54 in the raised position shown in Fig. 2 whereby the pressure foot assembly 23 is raised off the table 14 and raised further until the locking lever pawl 90 is in the notch 92 of the disc 56, the inner end of the plunger 47 (see Fig. 3) may be withdrawn to its outer position, whereupon the inner frame 24 will readily slide over the saw post 16 from the back forward. When the offset 30 of the catch 26 falls into place around the front edge of the post 16, the device 20 may be moved up or down over the post 16 until the inner end of the plunger 47 enters the hole in the post 16 which is provided by the maker of the band saw for other attachments. With the pressure foot assembly 23 thus held in the raised position, the work sheet may be brought up to the saw and the pressure foot lowered to the work by withdrawing the locking lever pawl 90 from the notch 92, pushing the operating lever 54 to its lower position so that the pawl 90 drops into the notch 94.

In pushing down the operating lever 54 to the lower position, the upper spring 74, through the first portion of the movement of the operating lever 54 acts without appreciable stretch as a mere connecting rod to draw the inner frame 24 and pressure foot 25 downward to the work while the saw post 16 and outer frame 34 remain stationary. During the latter portion of the movement of the operating lever 54, however, the spring 74 is stretched and its tension, and consequently its force on the pressure foot 25, greatly increased, whereby the work is resiliently and yieldably held to the table whereby vibration is eliminated.

Although certain devices have been herein described as comprising certain features of construction and arrangements and operations of parts, it is nevertheless to be understood that various changes may be made in construction, use or operation without departing from the spirit or scope of this invention as defined in the appended claims.

Having thus described an embodiment of my invention, I claim:

1. An antivibration attachment for sawing large sheets on a band saw which comprises an inner frame with a pressure foot on the lower end, said inner frame being adapted to fit around and be vertically slidable on the lower end of a band saw post, an outer frame surrounding and vertically slidable with respect to said inner frame but fixed with respect to said band saw post, an operating lever fulcrumed on the outside of said outer frame, a resilient means connecting the load point on said operating lever to the upper end of said inner frame, and a resilient means connecting the said load point to the lower end of said inner frame.

2. An antivibration attachment for sawing large sheets on a band saw, which comprises an inner frame with a pressure foot on the lower end adapted to surround and be vertically slidable on the lower end of a band saw post, an outer frame surrounding and vertically slidable with respect to said inner frame but fixed with respect to said band saw post, a manually operable lever of the second order having the fulcrum end pivoted on said outer frame, the outer end adapted for manual operation, and load carrying means intermediate the ends, a resilient means connecting the load carrying means to the upper end of said inner frame, and a second resilient means connecting said load carrying means to said lower end of said inner frame.

3. The attachment defined in claim 2 with a locking lever hinged to said outer frame, and notches in said operating lever to be engaged by the free end of said locking lever for limiting movement of said operating lever to predetermined fixed positions.

4. The attachment of claim 3 with spring means for seating the free end of said locking lever in said notches.

5. A work hold-down attachment for a band saw, which comprises an inner frame adapted to be carried on a band saw post and slidably fitted for vertical movement thereon, a pressure foot fixed to the lower end of said inner frame, an outer frame slidably fitted for vertical movement with respect to said inner frame, means to fix said outer frame against vertical movement with respect to said band saw post, an operating lever of the second order having one end fulcrumed on said outer frame and the other end adapted for manual operation, a load supporting member carried intermediate the ends of said operating lever, spring means having one end fast on said load supporting member and the other end attached to the upper end of said inner frame, and a second spring means having one end fast on said load supporting member and the other end attached to said pressure foot.

6. The device of claim 5 and a spring actuated plunger carried by said outer frame and adapted to enter an opening in said saw post to fix said outer frame against vertical movement with respect to said saw post.

7. The device of claim 5 with antifriction rollers on the forward ends of the pressure foot.

THOMAS W. G. LYONS.

REFERENCES CITED

The following references are of record in the file of this patent:

UNITED STATES PATENTS

| Number | Name | Date |
|---|---|---|
| 1,773,557 | Walrath | Aug. 19, 1930 |
| 2,099,321 | Tautz | Nov. 16, 1937 |
| 2,347,918 | Lethenstrom | May 2, 1944 |